US011113534B1

(12) United States Patent
Conger et al.

(10) Patent No.: US 11,113,534 B1
(45) Date of Patent: Sep. 7, 2021

(54) DETERMINING LOCALIZED WEATHER BY MEDIA CLASSIFICATION

(71) Applicant: Alarm.com Incorporated, Tysons, VA (US)

(72) Inventors: Dave Conger, Tysons, VA (US); Christopher Silverman, Alexandria, VA (US)

(73) Assignee: Alarm.com Incorporated, Tysons, VA (US)

(*) Notice: Subject to any disclaimer, the term of this patent is extended or adjusted under 35 U.S.C. 154(b) by 137 days.

(21) Appl. No.: 16/403,833

(22) Filed: May 6, 2019

Related U.S. Application Data

(60) Provisional application No. 62/668,051, filed on May 7, 2018.

(51) Int. Cl.
*G01W 1/10* (2006.01)
*G06K 9/00* (2006.01)
*G06K 9/62* (2006.01)
*G05B 13/02* (2006.01)

(52) U.S. Cl.
CPC ........... *G06K 9/00718* (2013.01); *G01W 1/10* (2013.01); *G05B 13/0265* (2013.01); *G06K 9/0063* (2013.01); *G06K 9/6256* (2013.01); *G01W 2203/00* (2013.01)

(58) Field of Classification Search
CPC ............ G06K 9/00718; G06K 9/0063; G06K 9/6256; G01W 2203/00; G01W 1/10; G05B 13/0265
See application file for complete search history.

(56) References Cited

U.S. PATENT DOCUMENTS

| 6,920,233 B2 | 7/2005 | Wolfson et al. |
| 6,961,061 B1 | 11/2005 | Johnson et al. |
| 8,818,029 B1 | 4/2014 | Mecikalski et al. |
| 9,310,518 B2 | 4/2016 | Haas et al. |
| 2012/0155704 A1* | 6/2012 | Williams ............ G06K 9/0063 382/103 |
| 2015/0163412 A1* | 6/2015 | Holley ............... G06K 9/00771 348/143 |
| 2017/0238484 A1* | 8/2017 | Arumugam .......... G06K 9/4652 |

* cited by examiner

Primary Examiner — Marcos L Torres
(74) Attorney, Agent, or Firm — Fish & Richardson P.C.

(57) ABSTRACT

Systems and techniques are described for utilizing video classification capabilities for providing accurate local weather. In some implementations, the techniques include the actions of obtaining images from cameras located at a monitored property. An expected weather forecast and an actual weather condition is obtained for the monitored property. A machine-learning model is trained to classify a current weather condition for the monitored property using the images from the cameras, the expected weather forecast, and the actual weather condition. A weather condition is obtained from the trained machine-learning model that indicates a particular weather condition at the monitored property based on one or more images from a camera and the expected local weather forecast at the monitored property.

16 Claims, 6 Drawing Sheets

400

Obtain data from one or more expected local weather devices and a camera from a first area
402

Based on the obtained data, pair expected local weather forecasts from the expected local weather devices with corresponding media from the camera
404

Provide the expected local weather forecasts paired with the corresponding media to a weather classifier to determine a current weather prediction in proximity to a geographic area of the first area
406

Provide the current weather prediction and the obtained sensor data to a control module to determine automation instructions to provide to a client device and a home device both corresponding with the first area
408

Provide the determined automation instructions and the current weather prediction to the client device and the home device of the first area
410

FIG. 4

DETERMINING LOCALIZED WEATHER BY MEDIA CLASSIFICATION

CROSS-REFERENCE TO RELATED APPLICATION

This application claims the benefit of U.S. Provisional Application No. 62/668,051 filed May 7, 2018, and titled "Determining Localized Weather by Media Classification," which is incorporated herein by reference.

TECHNICAL FIELD

The subject matter of the present disclosure is generally related to weather recognition, and more particularly, to weather recognition using classification models.

BACKGROUND

Obtaining and distributing accurate weather prediction is often a challenge, as weather prediction is generally aggregated at a level that is either too geographically broad or over too long of a time frame to be entirely reliable. For example, knowing that rain has been identified in a zip code does not mean that it is raining at every point within that zip code. Similarly, a weather station may never receive any rain, but a location nearby might. This lack of reliable knowledge makes it difficult to provide a confident description of the state of a property.

SUMMARY

The subject matter of the present disclosure is related to techniques of utilizing video classification capabilities to provide accurate local weather data to users. Specifically, the video classification capabilities may make of use of recorded media (e.g., video clips and images) from an integrated security environment for security measures. The security measures may include monitoring a property, such as a residential or commercial facility, with a monitor unit for detecting intrusions and other potentially harmful acts.

The monitor unit obtains recorded media from each of the one or more cameras found in the monitored property. The recorded media may be recording of an area surrounding an exterior of the monitored property. The recorded media includes one or more visual frames of data. In addition, the monitor unit obtains non-visual data, such as sensor data and device status data of the monitored property. The monitor unit provides the recorded media and the non-visual data to a data analyzer for processing. The monitor unit may alternatively include the data analyzer for further processing of the recorded media and the non-visual data.

The data analyzer obtains the recorded media and the non-visual data from the monitored property. In addition, the data analyzer obtains expected local forecast weather data to supplement the processing of the recorded media and the non-visual data. The data analytics server trains a neural network model with previously classified footage of labeled weather. Once the data analytics server sufficiently trains the neural network model to classify weather patterns in images, the data collection system may store the trained neural network model in memory and transmit the trained neural network model to cameras located at other monitored properties for weather classification. The cameras located at each monitored property can use the trained neural network model to classify weather patterns in camera footage without the use of the sensor data and weather forecasting data.

Additionally, the data analytics server can provide automation instructions to a monitored property based on the weather classification and the sensor data. The automation instructions may provide instructions to the monitored property to close and lock opened doors, close and lock one or more opened windows, and close garage doors in view of a potentially damaging weather classification, such as hail.

In one general aspect, a method is performed by one or more computers that includes: obtain images from cameras located at a monitored property; obtain an expected weather forecast and an actual weather condition for the monitored property; train a machine-learning model to classify a current weather condition for the monitored property using the images from the cameras, the expected weather forecast, and the actual weather condition; and obtain a weather condition from the trained machine-learning model that indicates a particular weather condition at the monitored property based on one or more images from a camera and the expected local weather forecast at the monitored property.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, the method includes pairing the images from the cameras with data identifying the expected local weather forecasts in proximity to the monitored property; and providing the paired images with the data identifying the expected local weather forecasts and the actual weather condition for training the machine-learning model.

In some implementations, obtaining the expected weather forecast and the actual weather condition for the monitored property further includes: obtaining the expected weather forecast from a third party resource; and obtaining the actual weather condition from water sensors at the monitored property.

In some implementations, the method includes determining a device at the monitored property that exposes a portion of the monitored property to the particular weather condition; and providing an instruction to the device that adjusts a position of the device to reduce an exposure of the portion of the monitored property to the particular weather condition.

In some implementations, providing the instruction to the device further includes providing an instruction to close and lock a front door of the monitored property when the particular weather condition includes rain at the monitored property.

In some implementations, the method includes: providing the current weather condition to a client device owned by a property owner of the monitored property; receiving a correction to the current weather condition from the client device; and training the trained machine-learning model to generate the correction to the current weather condition using the correction to the current weather condition, the one or more images from the camera and the expected local weather forecast used to generate the current weather condition.

In some implementations, the method includes: providing the trained machine-learning model to each of the cameras at the monitored property; and receiving a weather condition from the trained machine-learning at each of the cameras.

The details of one or more implementations are set forth in the accompanying drawings and the description below. Other features will be apparent from the description and drawings, and from the claims.

DESCRIPTION OF DRAWINGS

FIG. 4 is a flowchart illustrating of an example process for utilizing a trained neural network model that detects localized weather and provides automated instructions to devices of a corresponding area.

Like reference numbers and designations in the various drawings indicate like elements.

DETAILED DESCRIPTION

Figure 1:
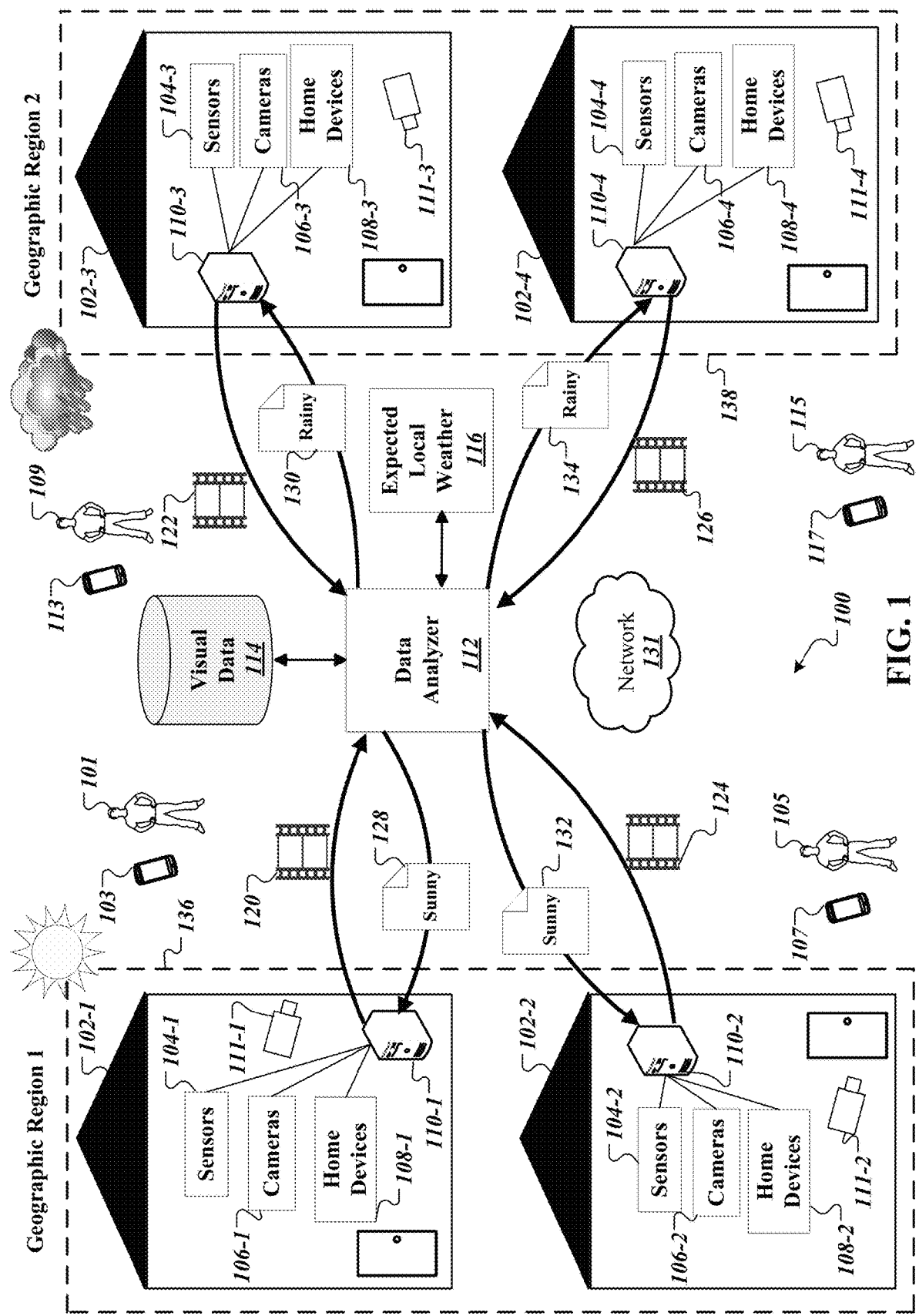
FIG. 1 is a contextual diagram of an exemplary system that utilizes video analytics classification of media to detect localized weather.

FIG. 1 is a contextual diagram of an exemplary system 100 that utilizes video analytics classification of media to detect localized weather. Though integrated security environment 100 is shown and described including a particular set of components including a monitor unit 110-1 through 110-4 (collectively monitor unit 110), sensors 104-1 through 104-4 (collectively sensors 104), cameras 106-1 through 106-4 (collectively cameras 106), home devices 108-1 through 108-4 (collectively home device 108), data analyzer 112, visual data 114, and expected local weather forecast 116, the present disclosure need not be so limited.

As shown in FIG. 1, a geographic region can include one or more monitored properties. For example, geographic region 1 includes monitored property 102-1 and monitored property 102-2. Additionally, geographic region 2 includes monitored property 102-3 and monitored property 102-4. A geographic region can be defined by a geographic area such as, for example, a state, a city, or a county. The geographic region can include more than two monitored properties. Only two monitored properties are shown in each geographic region in FIG. 1 for illustrative purposes.

A monitor unit 110-1 and other components within a monitored property may monitor the monitored property, such as monitored property 102-1. The monitored property may be a residential facility, such as a home, a commercial facility, such as a corporate office building, a storage facility, such as a warehouse, or a transportation facility, such as an airport, to name a few examples. Each monitored property may include one or more cameras, one or more sensors, and one or more home devices. The components within each monitored property 102 can include one or more sensors 104, one or more cameras 106, and one or more home devices 108. The one or more video cameras 106 may include video cameras, such as video camera 111-1 for monitored property 102-1 that can be located at the exterior of each monitored property 102 near the front door, located at the exterior of each monitored property 102 near the backyard, as well as located at the interior of each monitored property 102. The cameras 111-1 can be anchored to the wall and include a unit to swivel over a predetermined direction, such as 180 degrees, for viewing its surrounding area.

The one or more sensors 104 in each of the monitored properties 102 can be located throughout each room of the monitored property 102 as well as at the exterior of the monitored property 102. The one or more sensors 104 can include a contact sensor positioned at the front door to determine if the front door is open or closed. The one or more sensors can also include a pressure sensor that receives button presses at a light switch device, a lock sensor that is positioned at the front door and each window of each monitored property 102. Additionally, the one or more sensors 104 can include a passive infrared sensor (PIR) located at the interior of each monitored property 102, as well as thermal sensors, depth sensors, infrared beam trip sensors, weight sensors, seismic sensors, inductive loop sensors such as vehicle detection loops, an RGB-D camera, and one or more light curtain sensors. Each of these sensors may be positioned in and around each monitored property 102 for the monitor unit 110 to utilize its output for monitoring purposes.

The contact sensor may sense whether the front door, the windows, or garage door corresponding to each monitored property 102 is in an open position or a closed position. The lock sensor can sense whether the front door, each window, and each garage door is in an unlocked or locked position. The one or more home devices 108 can include home appliances such as a washing machine, a dryer, a dishwasher, an oven, a stove, a microwave, and a laptop, to name a few examples. In a commercial facility, the one or more home devices 108 may include a printer, a copier, a vending machine, and a fax machine to name a few examples. In another example, should the monitored property 102 be a transportation facility, such as an airport, the one or more home device 108 may include a ticket booth, a printer, a baggage scanner, and a scale, to name a few examples.

Each monitor unit 110 communicates over a wired or a wireless network connection with each of the one or more sensors 104, the one or more cameras 106, and the one or more home device 108 (e.g., for a residential facility, these home devices can include a washing machine, a dryer, a dishwasher, an oven, a stove, a microwave, a laptop, etc.). In addition, the monitor unit 110 can receive data from each of the sensors, cameras, and home devices that describe events detected by each of the sensors, the cameras, and the home devices.

In some implementation, each of the connected devices may connect to the monitor unit 110 using Wi-Fi, Bluetooth, or any other communication protocol utilized to communicate over a network to the monitor unit 110. Additionally, the monitor unit 110 communicates over a long-range wired or wireless connection with the data analyzer 112 over a network 131 utilizing one or more communication links.

In some implementations, the data analyzer 112 is located in a remote position from each of the monitored properties 102, and provides the data analytics for media provided by each monitored property 102. For example, other monitored properties such as monitored properties 102-2, 102-3, and 102-4. The data analyzer 112 may also monitor additional other residential properties located in various geographic regions not illustrated in FIG. 1. In other implementations, the data analyzer 112 may be located locally at each monitored property 102. For instance, each data analyzer 112 may be incorporated in the monitor unit 110. In other implementations, the data analyzer 112 may be located in each client device 103, 107, 113, and 117 that corresponds to each monitored property 102.

In some implementations, the data analyzer 112 communicates bi-directionally with each monitor unit 110. Specifically, the data analyzer 112 receives media from the monitor unit 110 from each monitored property 102. Additionally, the data analyzer 112 receives sensor data descriptive of events detected by the sensors 104 in each monitored property 102. The data analyzer 112 can also receive data from each of the home device 108 that describe a status for each of the home devices 108. For example, a home device 108 such as a printer may indicate a status of powered on and printing. In another example, a home device 108 of an oven may provide a status of powered on and operating at 400 degrees F. In response to receiving the media, sensor data, and the status from each of the home devices 108, the data analyzer 112 provides a description of the detected weather from the media and property automation instructions to each of the monitor unit 110. In some implementations, the data analyzer 112 provides the description of the detected weather from the media and the property automation instructions to a client device that corresponds to each of the monitored properties 102.

In some implementations, the one or more sensors 104 can detect a presence or movement of an object, such as an individual, an animal, a vehicle, or an item, to name a few examples, at each of the monitored properties 102. For example, the monitored property 102 may include a weight sensor under a doormat behind the front door to indicate a measurement of force applied downward on the doormat. For instance, the weight sensor may detect a change in weight that has been applied to the doormat when a property owner or a pet has stepped on the doormat. In other instances, the monitored property 102 may include one or more inductive loop sensors under a garage floor to detect a vehicle or movement of a vehicle entering or leaving a garage of the monitored property 102. The inductive loop sensors may detect a vehicle passing over which induces eddy currents in the inductive loop sensors, decreases inductance of the inductive loop sensors, which generates a pulse to provide as a likelihood of vehicle detection/movement. The inductive loop sensors may also be placed underneath driveways and yards to detect weather patterns, such as winds blowing. In another example, the sensors 104 may include one or more motion sensors that detect movement, such as a PIR motion sensor. The motion sensors provide a likelihood that motion has occurred in the motion sensors field of view, whether the motion comes from a moving person, a moving animal, a falling object, a tree moving from weather activity, or a car moving towards or away from the monitored property. In another example, the sensors 104 may include one or more seismic sensors to measure seismic vibrations within proximity to the monitored property 102. In this instance, the one or more seismic sensors may be placed in the driveway, garage, or even a room of the monitored property 102 to detect ground vibrations because of movement on top of the ground or beneath the ground.

Each of the one or more sensors 104, the one or more home devices 108, and the one or more cameras 106, can provide a continuous stream of data to the monitor unit 110. In other implementations, these devices can provide data to the monitor unit 110 upon request. In particular, the one or more sensors 104 can provide a continuous stream of data to the monitor control 110 upon a detection of a likelihood of movement or some other activity. The likelihood of detection may indicate object identification, object movement, or some other detected activity, depending on the type of sensor that provides the likelihood. For example, a sensor that detects weight may provide object identification when the sensor detects weight exceeding a specified weight threshold. Additionally, a PIR sensor may provide object movement detection when the PIR sensor detects movement in a frame. In some implementations, the one or more cameras 106 can provide the continuous stream of data to a local video storage device located at the monitor unit 110.

In other implementations, the one or more sensors 104 may provide data to the monitor unit 110 only when a sensor has tripped (i.e., a sensor tripping indicates a strong likelihood of detection). The tripped sensor that streams data to the monitor unit 110 may provide data indicating a likelihood of detection in the format of voltage. For example, the data can indicate a voltage high, such as 3.3V, or a voltage low, such as 1.5V, depending on the likelihood of detection. For example, a high voltage value may indicate a likelihood of strong detection and a low voltage value may indicate no detection. In other implementations, the high voltage value may not indicate a likelihood of detection and a low voltage value may indicate a strong likelihood of detection. The sensor may additionally provide a timestamp to the monitor unit 110 indicating at time at which the detection or non-detection has occurred.

In some implementations, the monitor unit 110 cross-correlates data provided by the sensors 104, the cameras 106, and the home devices 108. The cross-correlation of data from each of these devices helps improve the detection accuracy of the monitor unit 110.

In some implementations, the monitor unit 110 may receive a continuous stream of media from the one or more cameras 106. The received media stream can be real time video or image clips from the cameras 106, such as camera 111. The monitor unit 110 may receive the continuous stream of media in real time or after the camera 111 has recorded the footage. In addition, the one or more cameras 106 can time-tag the media footage for tracking and reassembling purposes by the monitor unit 110. Typically, the one or more cameras 106 can also insert an ID number into each frame of streamed media to the monitor unit 110 for reassembly. By time stamping and providing IDs for each frame of media, the monitor unit 110 can cross correlate the media packets from the one or more cameras 106 with data provided by the one or more sensors 104 and data provided by the one or more home devices 108.

The monitor unit 110 can determine a location of the one or more cameras 106 in the monitored property 102 based on the identified device ID provided by each camera. For example, the monitor unit 110 can receive a stream of media from a camera, such as camera 111 that has a device ID of 011. The monitor unit 110 can retrieve a device type from a device table stored in the monitor unit 110 to determine the device type and its corresponding location. For example, the device ID may indicate to the monitor unit 110 that the device providing the data stream is camera 111 and is located in the living room of the monitored property 102. Upon moving the camera 111 around the monitored property, a property owner 101 can specify the newly moved location of the camera in the device table through an application of the client device 103.

In some implementations, the one or more cameras 106 may be located in areas in the monitored property 102 that focuses on areas also monitored by the one or more sensors 104. For example, the camera 111-1 may located outside of the front door of the monitored property 102-1 focused on the driveway and the sidewalk. In this instance, a motion sensor may also be placed outside the front door to detect motion of a person or object in close proximity to the camera 111-1. In other instances, the camera 111-1 may be placed inside the monitored property 102-1, such as in the living room, the basement, the kitchen, where other sensors from the one or more sensors 104-1 currently monitor for motion, weight, and presence of light.

In some implementations, the monitor unit 110 can provide data to the data analyzer 112 over network 131. The data can include media 120 from monitor unit 110-1, media 124 from monitor unit 110-2, media 122 from monitor unit 110-3, and media 126 from monitor unit 110-4, recorded from each respective camera 111. Additionally, each monitor unit 110-1 provides sensor data from the one or more sensors 104 and home device data from the one or more home devices 108 from each corresponding monitored property 102.

The monitor unit 110 can provide media 120, 122, 124, and 126 to the data analyzer 112 to generate a trained neural network model to detect weather patterns. In some implementations, the monitor unit 110 can provide the media 120, 122, 124, and 126 at various times throughout the day. In other implementations, the monitor unit 110 can provide the media 120, 122, 124, and 126 to the data analyzer 112 when the one or more sensors 104 indicate that a detection has occurred.

The media 120, 122, 124, and 126 provided by each monitor unit 110 to the data analyzer 112 can include data as a packet. In particular, the packet data can include the media format provided by each particular camera from the one or more cameras 106, the device ID for each of the one or more cameras 106, a timestamp for each frame of the media, and a particular description of the location of the camera 111 found in the monitored property 102. For example, the media 120 can include a 20 second video clip of the sky from camera 111-1 pointed outwards in a form such as MPEG, a device ID such as 001, timestamps from 4/13/2001 at 10:00:00 to 4/13/2001 at 10:00:20, and "OUTDOOR' as a string to describe the location of camera 111-1 located in the monitored property 102.

In some implementations, the monitor unit 110 also provides the sensor data from the one or more sensors 104 and the status of the home devices 108 to the data analyzer 112. The monitor unit 110 can provide the sensor data and the status of the home devices 108 to the data analyzer 112 at the same time it provides the media. Alternatively, the monitor unit 110 can provide the sensor data and the status of the home devices 108 to the data analyzer 112 at a different time than the media.

In some implementations, the data analyzer 112 receives expected local weather 116 from various sources. The expected local weather 116 incorporates data from various weather sources such as, for example, weather forecast provided by various websites on the INTERNET, weather devices such as, for example, barometers to measure atmospheric pressure; thermometers to measure out door temperature; hygrometers to measure outdoor temperature and humidity; anemometers to the measure the direction and speed of wind; and, rain gauges to measure the amount of rainfall. The data from each of these devices and sources is provided as expected local weather forecast data to the data analyzer 112 for further analysis.

The data analyzer 112 can receive the media 120, 122, 124, 126, the expected local weather forecast 116, and the sensor data over network 131 to store in its data in the visual data 114. For instance, the visual data 114 stores a 20 second video clip by recorded by the camera 111-1 of a flower outside the monitored property 102-1, motion data of motion detection of the flower moving, and weather data provided by the various weather websites and various weather devices for the zip code encompassing the monitored property 102-1. Additionally, the data analyzer 112 can also store any other data provided by the sensors 104 and data provided by the status of the home devices 108 with weather data and the media data in the visual data 114. For example, the stored data in the visual data 114 can include the 20 second video clip including a timestamp of 9/28/2018 10:00:00 to 9/28/2018 10:00:20, device ID of 001, "OUTSIDE" as a string to represent the location of the camera 111-1 in the monitored property 102-1, weather data that indicates in zip code of 20001 the weather is sunny with a temperature of 75 degrees Fahrenheit. In other implementations, the visual data 114 stores previously recorded media that is classified by a weather label.

In some implementations, the data stored in the visual data 114 may be used to train a weather classifier stored in the data analyzer 112. The data analyzer 112 may initiate training a model for the weather classifier using data stored in the visual data 114 and additional data received from the expected local weather 116. For instance, the data analyzer 112 begins to train the weather classifier when a sufficient amount of data exists in the visual data 114. The weather classifier may be trained to detect a weather pattern provided in the media data. For example, the weather classifier can be trained to detect the weather patterns in a frame of media data from a video clip or a frame of image data. The weather pattern can include a detection of snow, rain, hail, strong winds, sunny skies, cloudy skies, and nighttime, to name a few examples.

In some implementations, the output of the weather classifier can be augmented with the data from the expected local weather forecast 116 to increase the performance of the weather classifier. In other implementations, the weather classifier can receive the data from the expected local weather forecast 116 to improve the output of the weather classifier. For example, warm weather forecasts provided by the local weather forecast 116 could help the weather classifier differentiate between snowflakes blowing in the wind versus small flower petals blowing in the wind. With the results of the weather classifier, the data analyzer 112 can accurately provide, with a known confidence level, awareness of the current weather conditions at the location specified by the zip code.

The weather illustrated over geographic region one is sunny and bright while the weather illustrated over geographic region two is cloudy and rainy. The outdoor camera 111-1 records media 120 of various outdoor locations within proximity to the monitored property 102-1 in order to classify the weather. Additionally, the outdoor camera 111-2 records media 124 of outdoor locations within proximity to the monitored property 102-2 for weather classification. The monitor unit 110-1 transmits the recorded media 120 to the data analyzer 112 and the monitor unit 110-2 transmits the recorded media 124 to the data analyzer 112 for weather classification. The data analyzer 112 processes the recorded media 120 along with data from the expected local weather forecasts 116 of a corresponding zip code to produce a weather classification 128. In response, the weather classifier in the data analyzer 112 determines the weather classification 128 to be "sunny," as illustrated in FIG. 1. Additionally, the data analyzer 112 processes the recorded media 124 along with data from the expected local weather forecasts 116 for a corresponding zip code to produce a weather classification 132. Like weather classification 128, the weather classifier in the data analyzer 112 determines that the weather classification 132 is also "sunny."

As shown in geographic region 2, the outdoor camera 111-3 records media 122 of outdoor locations within proximity to the monitored property 102-3 for weather classification. Additionally, the outdoor camera 111-4 records media 126 of outdoor locations within proximity to the monitored property 102-4 for weather classification. The monitor unit 110-3 transmits the recorded media 122 to the data analyzer 112 and the monitor unit 110-4 transmits the recorded media 126 to the data analyzer 112 for weather classification. The data analyzer 112 processes the recorded media 122 and the recorded media 126 along with data from the expected local weather forecasts 116 of a corresponding zip code to produce weather classifications 130 and 134, respectively. The weather classifier in the data analyzer 112, which processes the recorded media, determines the weather classification 130 to be "rainy" and the weather classification 134 to be "rainy."

In some implementations, the data analyzer 112 provides the weather classifications 128, 130, 132, and 134 to each respective monitor unit 110. Alternatively, the data analyzer 112 can provide the weather classifications 128, 130, 132, and 134 to each client device corresponding to the respective monitored property 102.

In some implementations, the data analyzer 112 can additionally provide safety instructions to each monitor unit 110. In other implementations, the data analyzer 112 can provide instructions to a client device of a property owner corresponding to the monitored property 102. In particular, the data analyzer 112 can determine the safety instructions using the weather classification and data from the one more sensors 104 and the one or more home devices 108. For example, if the data analyzer 112 determines that the localized weather is rainy and determines from the sensor data of a particular monitored property 102 that a door is open, the data analyzer 112 transmits an indication to a corresponding monitored control unit server 110 or to a client device instructing the property owner to close the door. This safety instruction helps protect the inside of monitored property 102 from damage due to current weather or potentially future weather.

Figure 2A:
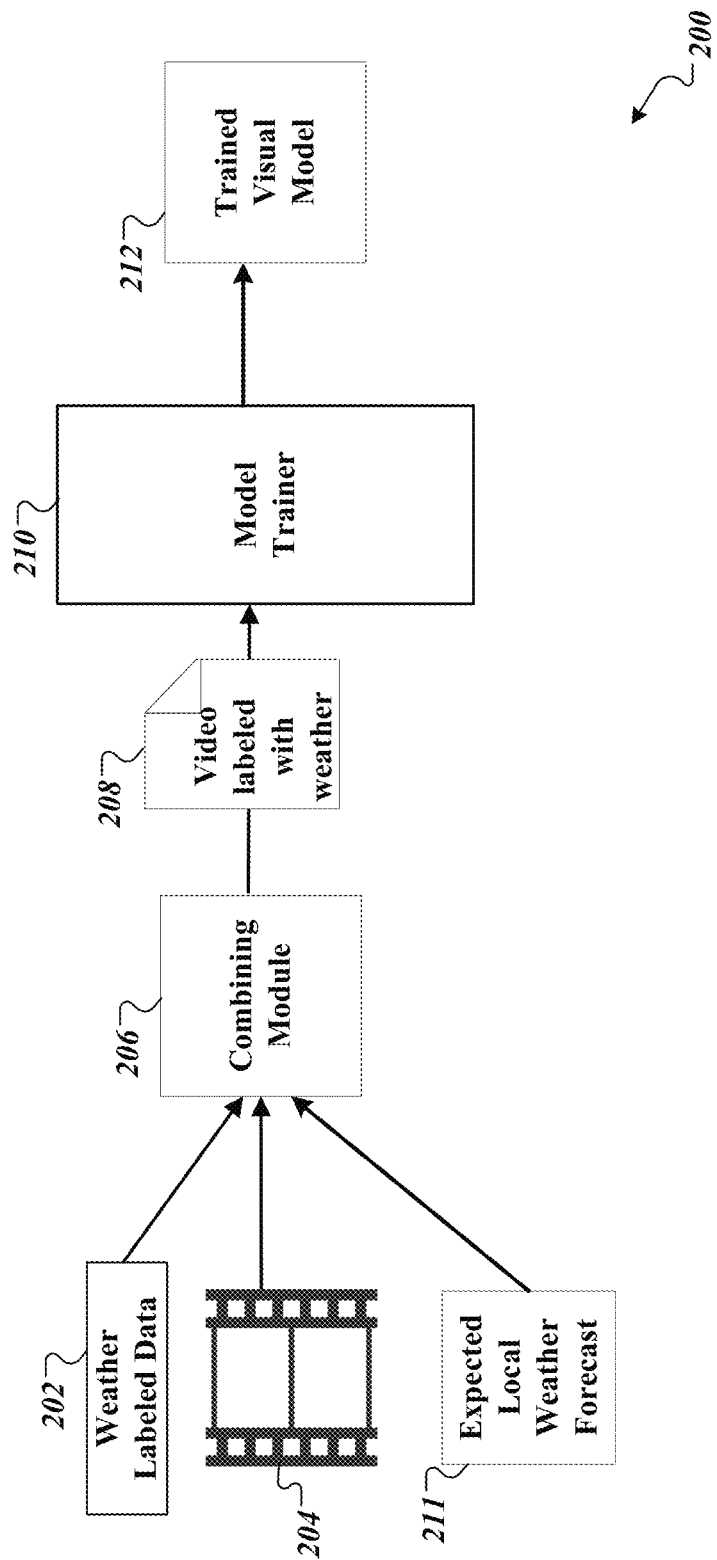
FIG. 2A is a contextual diagram of an exemplary system for training a neural network model using media and localized weather data.

FIG. 2A illustrates a contextual diagram of an exemplary system 200 for training a neural network model using media and localized weather data. The system 200 illustrates a process for training the neural network model inside the data analyzer 112. In particular, the neural network model can be a deep learning model for weather classification. The data analyzer 112 can train the weather classification model such that the weather classification model detects a type of weather in image data provided by the monitored property without the use of non-visual sensors. In order for the data analyzer 112 to train and generate the weather classification model, the data analyzer 112 needs a sufficient amount of training data such that the weather classification model can detect a weather type in visual image frames alone. In particular, the weather classification model may detect the weather type in the visual image frames regardless of the background in the visual image frames. For example, the weather classification model can detect snow in a foreground of a visual image when the background includes trees, houses, roads, and grass. In another example, the weather classification model can detect snow in a background or a mid-ground of a visual image when the foreground includes objects such as trees, humans, flowers, parks, and other objects.

In some implementations, the weather classification model will be able to distinguish between objects moving that look similar in a visual image. For example, the weather classification model will be able to determine a difference between snowflakes, rainfall, and flower petals blowing in the wind. Using expected local weather forecast data and previously labeled weather data, the weather classification model may intelligently distinguish between the objects using data that includes temperature, wind pressure, atmospheric pressure, color of object, and predicted weather.

In some implementations, the system 200 includes a combining module 206. The combining module 206 receives weather labeled data 202 that includes previously labeled recorded media with a weather classification from the visual data 114, recorded media 204 from a monitored property 102, and data indicative of expected local weather forecast 214. The combining module 206 correlates the recorded media 204 with the data indicative of the expected local weather forecast 214. In particular, the data indicative of the expected local weather forecast 214 suggests the current weather within proximity to the monitored property 102 and more particularly, the weather shown in the frame of the recorded media 204. For example, if the data indicative of the expected local weather forecast 214 suggests the weather to be currently raining, then the recorded media 204 may illustrate rain in its framed image data. The rain may be shown in the recorded media 204 in a foreground, mid-ground, or a background of the recorded media 204. In some implementations, the combining module 206 can tag the portion of the recorded media that includes the weather. For example, snow shown in the foreground of the recorded media can be tagged with a label of snow with data indicative of the expected local weather 116 illustrating snow. In another example, rain shown in the background of the recorded media can be tagged with data indicative of the expected local weather 116 illustrating rain. This data indicative of the expected local weather 116 can include information from the weather web sites, data from the barometers, thermometers, and rain gauges corresponding to weather within proximity to the monitored property 102.

In some implementations, the data analyzer 112 retrieves weather labeled data 202 from the visual data 114 based on data indicative of the expected local weather forecast 214. For example, if the data indicative of the expected local weather forecast 214 illustrates rain, then the data analyzer 112 retrieves weather labeled data 202 from the visual data 114 of rainy weather. In some implementations, a type of weather classification indexes the data stored in the visual data 114. For example, one row of data includes an indexed entry for rain as the type of weather from the expected local weather forecast, recorded media from a camera illustrating rain, sensor data corresponding to a time when the recorded media was captured, and data from the home devices corresponding to a time when the recorded media was captured.

In some implementations, the combining module 206 labels the recorded media 204 with the data indicative from the expected local weather forecast 214. For example, the combining module 206 labels the recorded media 204 with the rainy weather forecast from the expected local weather forecast 214. In particular, by labeling the recorded media 204 with a weather type, the model trainer 210 can instruct the trained visual model 212 to understand what type of weather is found in the recorded media 204 and where the particular weather is found in the recorded media 204.

In some implementations, the combining module 206 additionally provides the weather labeled data 202 along with the labeled recorded media 204 as additional data used to train the weather classification model. The combining module 206 outputs video labeled with weather type 208 to provide to the model trainer 210. The video labeled with weather type 208 includes labeled recorded media 204 and recorded media from the weather labeled data 202. The video labeled with weather type 208 is provided to the model trainer 210.

In some implementations, the model trainer 210 receives the video labeled with the weather type 208 that includes an image frame, of a detection of weather type, as designated by the expected local weather forecast 214. The model trainer 210 uses data from the received video labeled with weather type 208 to train a neural network model or any other type of machine learning model. The neural network model may include an input layer, an output layer, and one or more hidden layers. The model trainer 210 may use a machine learning technique to continuously train the deep learning model as the model trainer 210 receives more data when applying the model. A deep learning model may be a neural network model with one or more hidden layers between an input layer and an output layer. For example, the model trainer 210 may train a convolutional neural network model (CNN) or a recurrent neural network model (RNN). The model trainer 210 seeks to train the deep learning model with the video labeled with weather type 208 input such that the neural network model can recognize the presence or absence of a weather type in the image frame from the image frame alone. In essence, with enough training data of weather identification from the visual data 114, the deep learning model should be able to detect a weather type, such as snow, distinguish the weather types from other weather types, and provide an accurate weather type to a property owner of a residential property, thus obviating the need for measuring tools to determine the weather type in other detection systems.

In some implementations, the model trainer 210 uses one or more sequential frames in the visual data 114 to train the deep learning model to detect a particular weather type. For example, by training the deep learning model to detect a particular weather type, such as rain, by analyzing one or more sequential frames in the visual data 114, the deep learning model can detect individual rain droplets as they move across the camera's field of view. Additionally, the deep learning model can detect a particular weather type, such as snow, by analyzing the rate at which an object moves in the one or more sequential frames in the visual data 114. In particular, by analyzing the rate at which objects move across the camera's field of view, the camera can determine whether the object is precipitation, such as rain or snow, based on the object's rate of speed from frame to another. The speed can be measured by determining the objects change in distance across a first frame and a second frame and dividing the distance by the time difference between the two frames. In particular, by the model trainer 210 measuring the time difference between a time-tag corresponding to the first frame and a time-tag corresponding to the second frame.

In some implementations, the model trainer 210 can use object identification in the one or more visual data 114 to screen out particular objects when identifying a weather classification. In particular, the model trainer 210 can identify one or more non-weather objects in the visual data 114 to assist the deep learning model with recognizing a particular weather type in the visual data 114. For example, if an image frame in the visual data 114 includes two humans, two trees, and rain drops, the model trainer 210 can label the two humans and the two trees as non-weather objects in order to assist the deep learning model with focusing its efforts on detecting the rain drops. In other implementations, the model trainer 210 can use one or more of the non-weather objects to help in identifying the particular weather type. For example, the model trainer 210 can use a direction that the leaves of the two trees are moving to determine the direction the raindrops are moving. In addition, the model trainer 210 can detect to a change in the weather by analyzing the leaf movement on the two trees. For example, if in one frame the leaves of the two trees are moving in the wind, and in the second frame the leaves of the two trees are not moving, the deep learning model can determine the first frame of image data indicates windy weather and the second frame indicates non-windy weather.

In some implementations, the model trainer 210 may generate a weather classification model, such as a trained visual model 212, after sufficiently training the neural network model. In some implementations, the data analyzer 112 may transmit the trained visual model 212 to one or more monitored properties 102-1 through 102-4. In particular, the data analyzer 112 may transmit the trained visual model 212 to each monitored control unit server 110 corresponding to each monitored property 102. In response to receiving the trained neural network model 212, each monitored control unit server 110 will transmit the trained neural network model 212 to each camera 111 in the respective monitored property 102. The processing for determining a detected weather type comes from the camera 106 when the trained visual model 212 is on the camera 106. For instance, the trained visual model 212 may be stored in the camera 111's memory and utilized by the camera 111 for weather classification without the use of other sensors or home devices.

In some implementations the system 100 for detecting a particular localized weather may use only a subset of the aforementioned components. In one example, implementations may exist that do not use the home device 108. Similarly, other implementations may exist in which the visual data 114 is stored within the data analyzer 112. Yet other alternative exemplary systems also fall within the scope of the present disclosure such as a system 100 that does not use a monitor unit 110. For these reasons, the system 100 should not be viewed as limiting the present disclosure to any particular set of necessary components.

Figure 2B:
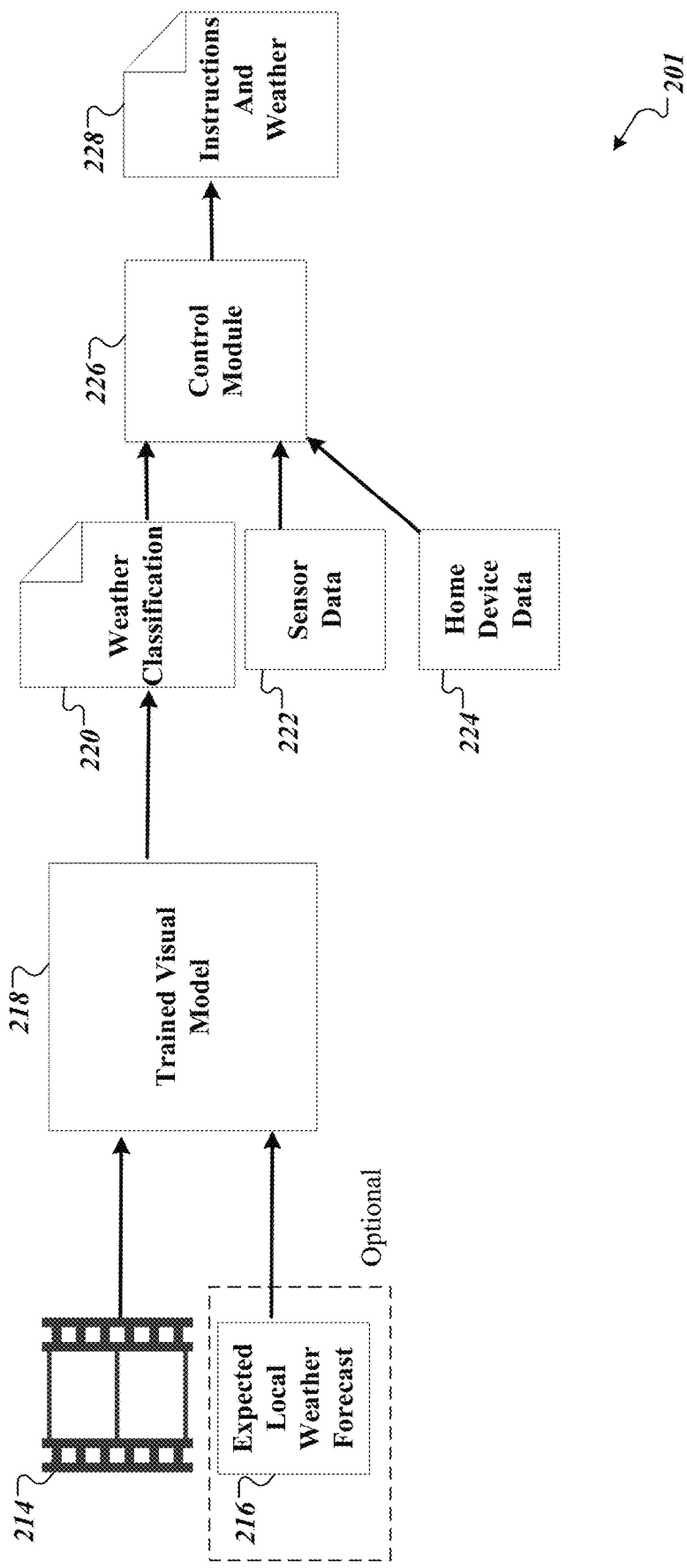
FIG. 2B is a contextual diagram of an exemplary system for utilizing a trained neural network model to detect localized weather and provide control instructions for security measures.

FIG. 2B illustrates a contextual diagram of an exemplary system 201 for utilizing a trained neural network model to detect localized weather and providing control instructions for security measures. In some implementations, the system 201 may be implemented on the data analyzer 112. In other implementations, the system 201 may be implemented on each camera 106 in a monitored property 102. In other implementations, the system 201 may be implemented in each monitor unit 110. In some implementations, a pre-trained weather classifier model 218 is preloaded onto the data analyzer 112 (or the camera 106). The pre-trained weather classifier model 218 can be adaptively retrained with incorrect and correct weather classification data from the monitor unit 110 and/or the visual data 114.

In some implementations, a camera, such as camera 111-1, may record real time footage of an area within proximity to the monitored property 102-1. For example, the camera 111-1 may record footage 216 of a view of the backyard of the monitored property 102-1. In some implementations, the camera 111-1 may provide each frame of the recorded footage 216 to the trained visual model 218 in memory. In other implementations, the camera 111-1 may provide each frame of the recorded footage 216 to the trained visual model 218 on the data analyzer 112 over the network 131. As illustrated in system 201, a frame of the recorded media 214 is provided to the trained visual model 218. In some implementations, data indicative of the expected local weather forecast 216 is provided to the trained visual model 218 to supplement the trained visual model 218's accuracy of a weather prediction. The expected local weather forecast 216 is an optional input and not necessary for the trained visual model 218 to output a weather classification 220 from the recorded media 216.

In some implementations, if the trained visual model 218 produces an output indicating a weather classification 220 in response to analyzing a frame from the recorded media 214, the camera 111 may provide an indication of the weather classification 220 to the monitored control unit server 110. Similarly, if the trained visual model 218 executes on the data analyzer 112, the data analyzer 112 produces a weather classification 220 and provides the weather classification 220 to the corresponding monitored control unit server 110. In some implementations, the trained visual model 218, whether on the data analyzer 112 or on the camera 111, provides the indication of the weather classification 220 to the client device corresponding to the monitored property 102. In other implementations, in response to the monitor unit 110 receiving the notification of the weather classification 220, the monitor unit 110 may transmit a notification to the client device corresponding to that monitored property 102. For example, the notification may include a push notification, a short message service (SMS), or an instant message. In other implementations, the monitor unit 110 may transmit the live video feed of the camera 111-1 to the client device 103 for real time viewing purposes along with a current label indicating the notification of the weather classification 220.

In some implementations, the data analyzer 112 can use the weather classification from each of the monitored properties to generate a weather model of a geographic region. In particular, although geographic one region is clearly indicated to have sunny weather, as illustrated by the sun shown over geographic region one, portions of geographic region one may not be sunny. For example, the data analyzer 112 may produce a weather classification 128 that is sunny for the monitored property 102-1 and a weather classification 132 that is cloudy for the monitored property 102-2. The data analyzer 112 can aggregate this weather classification information from each monitored property 102 to create a weather classification model from each area. In particular, the weather classification model can update in real time such that a property owner can see weather patterns according to weather classifications. In other implementations, the weather classification model can update periodically.

In some implementations, a property owner can view the weather classification model overlaid on top of a map. The property owner can view this interface by interacting with a smart home application on his or her client device, such as client device 103. The overlay may include labels and pictures of a type of weather classification over particular areas of the map. In addition, the property owner can select on the pictures and labels over the particular areas to view additional information. The additional information can include data provided by the expected local weather forecast 116. This includes website and weather device data accompanied by the frame of recorded media.

In some implementations, if the trained visual model 218 executes on the data analyzer 112, the data analyzer 112 may receive feedback from each of the monitored properties 102 to tune the trained visual model 218. In particular, the feedback data may be similar data utilized to train the neural network model by the model trainer 210. In other implementations, the feedback data may include a correction of the labeled data along with the recorded media data to tune the trained visual model 218. For example, the data analyzer 112 provides an indication of a weather classification to the client device 103 of property owner 101. The property owner 101 reviews on his or her client device 103 the indication of the weather classification from the data analyzer 112 that includes the recorded media 120 and a label of the weather classification corresponding to the output of the trained visual model 218.

After reviewing the indication of the weather classification, the property owner 101 determines that the label of the weather classification is incorrect. The property owner 101 can interact with the application on the client device 103 to indicate that the determined weather is not correct. For example, the property owner 101 can indicate that the labeled weather of "snow" is not correct, and the actual weather in the recorded media is "rain." In response, the client device 103 transmits the corrected label and the recorded media to the monitor unit 110-1. The monitor unit 110-1 provides an indication to the data analyzer 112 that the trained visual model 218 incorrectly detected weather in the recorded media. As a result, the data analyzer 112 provides the newly received recorded media 216 and corrected classification label to the model trainer 210 in the same manner used to train the neural network model. In response, the data analyzer 112 may then provide the updated trained visual model 212 to each of the cameras 111 for an improved and updated weather classification detection.

In some implementations, the data analyzer 112 can use the weather classification 220, data 222 from sensors 104, and data 224 from home devices to determine one or more safety instructions to provide to a corresponding monitored property 102. In particular, the data analyzer 112 includes a control module 226 that processes the weather data, the sensor data, and the home device data, to determine the one or more safety instructions to provide to the monitored property 102. For example, the weather classification 220 indicates to the data analyzer 112 that the current weather is rain, the sensor data 222 indicates to the data analyzer 112 that the front door of the monitored property 102-1 is open, and the sensors data 222 indicates that a self-automated vacuum is currently vacuuming behind the front door. The control module 226 determines that the weather classification 220 includes an indication of weather that could potentially damage a portion of an interior or exterior of the monitored property 102. In addition, should any of monitored property's doors or windows be unlocked or open, the control module 226 should notify the corresponding property owner. In this instance, since the control module 226 receives an indication that the front door is open and that the weather currently forecasts rain, the control module 226 determines that the property owner is to be notified. As such, the control module 226 provides a safety instruction in the instructions and weather message 228 to provide to the client device of the corresponding property owner.

In addition, the control module 226 correlates the location of the self-automated vacuum in the monitored property 102 to the indication that the front door of the monitored property 102 is open. As such, the control module 226 provides an additional notification in the instructions and weather message 228 to move the self-automated vacuum away from the front door and to close the front door. Additionally, the control module 226 can determine to provide a message to the property owner to shut and lock one or more opened windows in the monitored property 102. In other instances, the control module 226 can determine to provide a message to property owner 102 to move car associated with the monitored property 102 inside the garage when the weather is hail or snow. Other examples are possible for the control module 226 to protect the valuables of his monitored property 102 when the trained visual model 218 has identified a potentially damaging weather classification.

In some implementations, the control module 226 provides instructions that can automatically interact with items in a monitored property 102. In particular, the control module 226 can provide automation instructions in the instructions and weather message 228 for the monitor unit 110 to automatically close, lock, or turn off the front door, windows, or the one or more home devices 108. For example, the control module 226 can provide an automation instruction to the monitor unit 110 to turn off a grill left on located outside the monitored property 102 when the weather classifier outputs determines the weather is raining from the recorded media. In another example, the control module 226 can provide an automation instruction to the monitor unit 110 close and lock the front door of the monitored property 102 when the weather classifier outputs determines the weather is raining from the recorded media. In another example, the control module 226 can provide an automation instruction to the monitor unit 110 to close the garage door when the weather classifier determines the weather is hailing from the recorded media.

In some implementations, in response to the monitor unit 110 receiving the automation instruction 228 from the data analyzer 112, the monitor unit 110 transmits a notification to the corresponding device for action. For example, if the automation instruction 228 includes an indication to close the front door because the current local weather is raining, the monitor unit 110 will automatically close the front door. In another example, if the automation instruction includes an indication to turn off the grill because it is raining, the monitor unit 110 will automatically turn off the grill. In some implementations, the monitor unit 110 can communicate with the house doors, garage doors, and windows along with the sensors 104, camera 106, and home devices 108.

Figure 3:
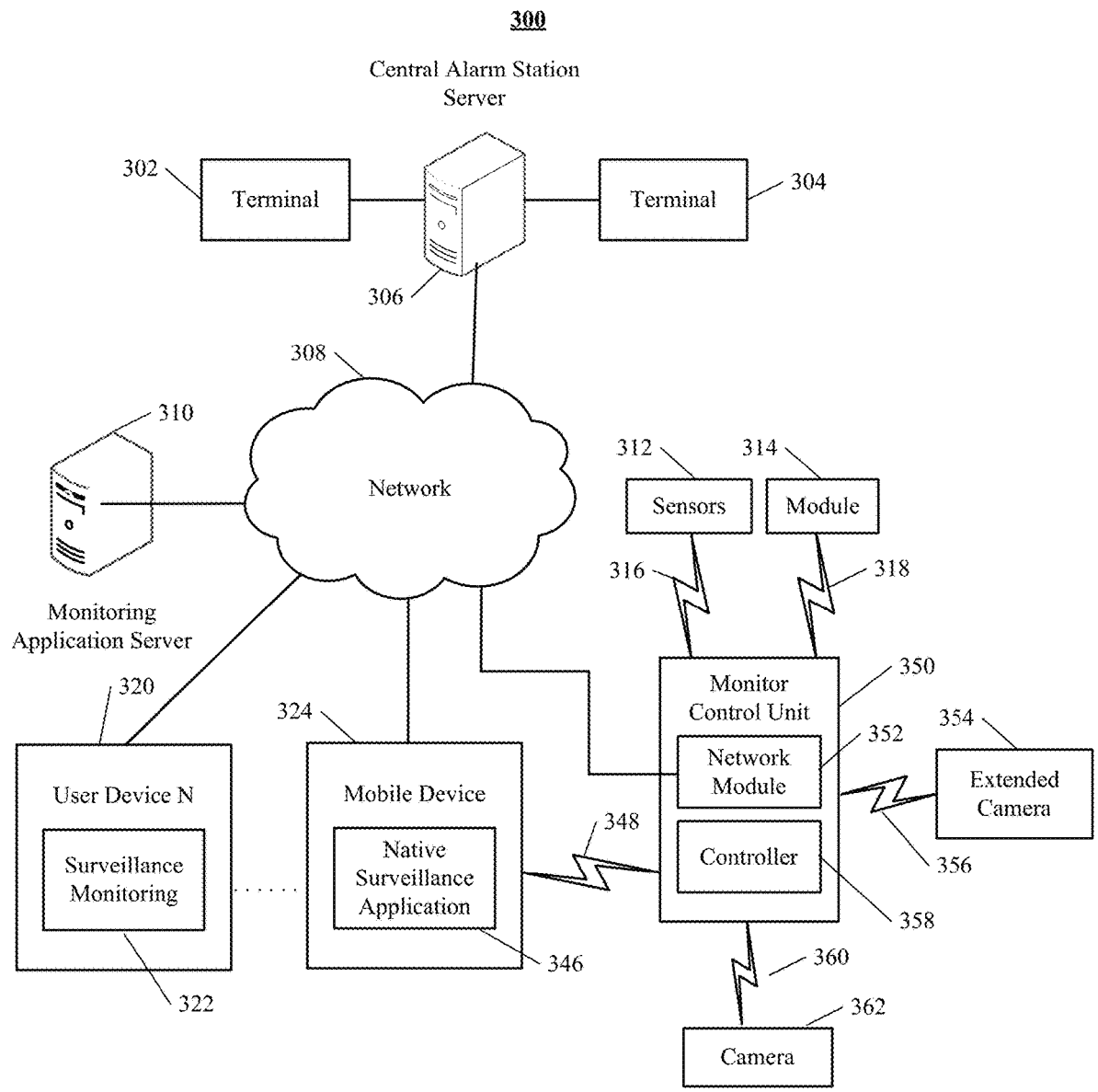
FIG. 3 is an example of a monitoring system for weather classification.

FIG. 3 illustrates an example of a monitoring system 300 for weather classification. The system 300 includes a network 308, a monitoring system control unit 350, one or more user devices 320, 324, a monitoring application server 310, and a central alarm station server 306. In some examples, the network 308 facilitates communications between the monitoring system control unit 350, the one or more user devices 320, 324 the monitoring application server 310, and the central alarm station server 306.

The network 308 is configured to enable exchange of electronic communications between devices connected to the network 308. For example, the network 308 may be configured to enable exchange of electronic communications between the monitoring system control unit 350, the one or more user devices 320, 324, the monitoring application server 310, and the central alarm station server 306. The network 308 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 308 may include multiple networks or subnetworks, each of which may include, for example, a wired or wireless data pathway. The network 308 may include a circuit-switched network, a packet-switched data network, or any other network able to carry electronic communications (e.g., data or voice communications). For example, the network 308 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 308 may include one or more networks that include wireless data channels and wireless voice channels. The network 308 may be a wireless network, a broadband network, or a combination of networks including a wireless network and a broadband network.

The monitoring system control unit 350 includes a controller 358 and a network module 352. The controller 358 is configured to control a monitoring system (e.g., a home alarm or security system) that includes the monitoring system control unit 350. In some examples, the controller 358 may include a processor or other control circuitry configured to execute instructions of a program that controls operation of an alarm system. In these examples, the controller 358 may be configured to receive input from sensors, detectors, or other devices included in the alarm system and control operations of devices included in the alarm system or other household devices (e.g., a thermostat, an appliance, lights, etc.). For example, the controller 358 may be configured to control operation of the network module 352 included in the monitoring system control unit 350.

The network module 352 is a communication device configured to exchange communications over the network 308. The network module 352 may be a wireless communication module configured to exchange wireless communications over the network 308. For example, the network module 352 may be a wireless communication device configured to exchange communications over a wireless data channel and a wireless voice channel. In this example, the network module 352 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 352 also may be a wired communication module configured to exchange communications over the network 308 using a wired connection. For instance, the network module 352 may be a modem, a network interface card, or another type of network interface device. The network module 352 may be an Ethernet network card configured to enable the monitoring system control unit 350 to communicate over a local area network and/or the Internet. The network module 352 also may be a voiceband modem configured to enable the alarm panel to communicate over the telephone lines of Plain Old Telephone Systems (POTS).

The monitoring system that includes the monitoring system control unit 350 includes one or more sensors or detectors. For example, the monitoring system may include multiple sensors 312. The sensors 312 may include a contact sensor, a motion sensor, a glass break sensor, or any other type of sensor included in an alarm system or security system. The sensors 312 also may include an environmental sensor, such as a temperature sensor, a water sensor, a rain sensor, a wind sensor, a light sensor, a smoke detector, a carbon monoxide detector, an air quality sensor, etc. The sensors 312 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 312 may include a radio-frequency identification (RFID) sensor that identifies a particular article that includes a pre-assigned RFID tag.

The monitoring system control unit 350 communicates with the module 314 and the camera 362 to perform surveillance or monitoring. The module 314 is connected to one or more lighting systems and is configured to control operation of the one or more lighting systems. The module 314 may control the one or more lighting systems based on commands received from the monitoring system control unit 350. For instance, the module 314 may cause a lighting system to illuminate an area to provide a better image of the area when captured by a camera 362.

The camera 362 may be a video/photographic camera or other type of optical sensing device configured to capture images. For instance, the camera 362 may be configured to capture images of an area within a building monitored by the monitoring system control unit 350. The camera 362 may be configured to capture single, static images of the area and also video images of the area in which multiple images of the area are captured at a relatively high frequency (e.g., thirty images per second). The camera 362 may be controlled based on commands received from the monitoring system control unit 350.

The camera 362 may be triggered by several different types of techniques. For instance, a Passive Infra-Red (PIR) motion sensor may be built into the camera 362 and used to trigger the camera 362 to capture one or more images when motion is detected. The camera 362 also may include a microwave motion sensor built into the camera and used to trigger the camera 362 to capture one or more images when motion is detected. The camera 362 may have a "normally open" or "normally closed" digital input that can trigger capture of one or more images when external sensors (e.g., the sensors 312, PIR, door/window, etc.) detect motion or other events. In some implementations, the camera 362 receives a command to capture an image when external devices detect motion or another potential alarm event. The camera 362 may receive the command from the controller 358 or directly from one of the sensors 312.

In some examples, the camera 362 triggers integrated or external illuminators (e.g., Infra-Red, Z-wave controlled "white" lights, lights controlled by the module 314, etc.) to improve image quality when the scene is dark. An integrated or separate light sensor may be used to determine if illumination is desired and may result in increased image quality.

The camera 362 may be programmed with any combination of time/day schedules, system "arming state", or other variables to determine whether images should be captured or not when triggers occur. The camera 362 may enter a low-power mode when not capturing images. In this case, the camera 362 may wake periodically to check for inbound messages from the controller 358. The camera 362 may be powered by internal, replaceable batteries if located remotely from the monitoring system control unit 350. The camera 362 may employ a small solar cell to recharge the battery when light is available. Alternatively, the camera 362 may be powered by the controller's 358 power supply if the camera 362 is co-located with the controller 358.

The sensors 312, the module 314, the camera 362, and the extended camera 354 communicate with the controller 358 over communication links 316, 318, 356, and 360. The communication links 316, 318, 356, and 360 may be a wired or wireless data pathway configured to transmit signals from the sensors 312, the module 314, and the camera 362 to the controller 358. The sensors 312, the module 314, and the camera 362 may continuously transmit sensed values to the controller 358, periodically transmit sensed values to the controller 358, or transmit sensed values to the controller 358 in response to a change in a sensed value.

The communication link 356 over which the extended camera 354 and the controller 358 communicate may include a local network. The extended camera 354 and the controller 358 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CATS) or Category 6 (CAT6) wired Ethernet network.

The monitoring application server 310 is an electronic device configured to provide monitoring services by exchanging electronic communications with the monitoring system control unit 350, the one or more user devices 320, 324, and the central alarm station server 306 over the network 308. For example, the monitoring application server 310 may be configured to monitor events (e.g., alarm events) generated by the monitoring system control unit 350. In this example, the monitoring application server 310 may exchange electronic communications with the network module 352 included in the monitoring system control unit 350 to receive information regarding events (e.g., alarm events) detected by the monitoring system control unit 350. The monitoring application server 310 also may receive information regarding events (e.g., alarm events) from the one or more user devices 320, 324.

In some examples, the monitoring application server 310 may route alarm data received from the network module 352 or the one or more user devices 320, 324 to the central alarm station server 306. For example, the monitoring application server 310 may transmit the alarm data to the central alarm station server 306 over the network 308.

The monitoring application server 310 may store sensor and image data received from the monitoring system and perform analysis of sensor and image data received from the monitoring system. Based on the analysis, the monitoring application server 310 may communicate with and control aspects of the monitoring system control unit 350 or the one or more user devices 320, 324.

The central alarm station server 306 is an electronic device configured to provide alarm monitoring service by exchanging communications with the monitoring system control unit 350, the one or more user devices 320, 324, and the monitoring application server 310 over the network 308. For example, the central alarm station server 306 may be configured to monitor alarm events generated by the monitoring system control unit 350. In this example, the central alarm station server 306 may exchange communications with the network module 352 included in the monitoring system control unit 350 to receive information regarding alarm events detected by the monitoring system control unit 350. The central alarm station server 306 also may receive information regarding alarm events from the one or more user devices 320, 324.

The central alarm station server 306 is connected to multiple terminals 302 and 304. The terminals 302 and 304 may be used by operators to process alarm events. For example, the central alarm station server 306 may route alarm data to the terminals 302 and 304 to enable an operator to process the alarm data. The terminals 302 and 304 may include general-purpose computers (e.g., desktop personal computers, workstations, or laptop computers) that are configured to receive alarm data from a server in the central alarm station server 306 and render a display of information based on the alarm data. For instance, the controller 358 may control the network module 352 to transmit, to the central alarm station server 306, alarm data indicating that a sensor 312 detected a door opening when the monitoring system was armed. The central alarm station server 306 may receive the alarm data and route the alarm data to the terminal 302 for processing by an operator associated with the terminal 302. The terminal 302 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 302 and 304 may be mobile devices or devices designed for a specific function. Although FIG. 3 illustrates two terminals for brevity, actual implementations may include more (and, perhaps, many more) terminals. For instance, the client devices 103, 107, 113, and 117 may be the illustrative examples of the terminals.

The one or more user devices 320, 324 are devices that host and display user interfaces. For instance, the user device 324 is a mobile device that hosts one or more native applications (e.g., the native surveillance application 346). The user device 324 may be a cellular phone or a non-cellular locally networked device with a display. The user device 324 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 324 may perform functions unrelated to the monitoring system, such as placing personal telephone calls, playing music, playing video, displaying pictures, browsing the Internet, maintaining an electronic calendar, etc.

The user device 324 includes a native surveillance application 346. The native surveillance application 346 refers to a software/firmware program running on the corresponding mobile device that enables the user interface and features described throughout. The user device 324 may load or install the native surveillance application 346 based on data received over a network or data received from local media. The native surveillance application 346 runs on mobile devices platforms, such as iPhone, iPod touch, Blackberry, Google Android, Windows Mobile, etc. The native surveillance application 346 enables the user device 324 to receive and process image and sensor data from the monitoring system The user device 320 may be a general-purpose computer (e.g., a desktop personal computer, a workstation, or a laptop computer) that is configured to communicate with the monitoring application server 310 and/or the monitoring system control unit 350 over the network 308. The user device 320 may be configured to display a surveillance monitoring user interface 322 that is generated by the user device 320 or generated by the monitoring application server 310. For example, the user device 320 may be configured to display a user interface (e.g., a web page) provided by the monitoring application server 310 that enables a user to perceive images captured by the camera 362 and/or reports related to the monitoring system. Although FIG. 3 illustrates two user devices for brevity, actual implementations may include more (and, perhaps, many more) or fewer user devices.

In some implementations, the one or more user devices 320, 324 communicate with and receive monitoring system data from the monitoring system control unit 350 using the communication link 348. For instance, the one or more user devices 320, 324 may communicate with the monitoring system control unit 350 using various local wireless protocols such as Wi-Fi, Bluetooth, zwave, zigbee, HomePlug (ethernet over powerline), or wired protocols such as Ethernet and USB, to connect the one or more user devices 320, 324 to local security and automation equipment. The one or more user devices 320, 324 may connect locally to the monitoring system and its sensors and other devices. The local connection may improve the speed of status and control communications because communicating through the network 308 with a remote server (e.g., the monitoring application server 310) may be significantly slower.

Although the one or more user devices 320, 324 are shown as communicating with the monitoring system control unit 350, the one or more user devices 320, 324 may communicate directly with the sensors and other devices controlled by the monitoring system control unit 350. In some implementations, the one or more user devices 320, 324 replace the monitoring system control unit 350 and perform the functions of the monitoring system control unit 350 for local monitoring and long range/offsite communication.

In other implementations, the one or more user devices 320, 324 receive monitoring system data captured by the monitoring system control unit 350 through the network 308. The one or more user devices 320, 324 may receive the data from the monitoring system control unit 350 through the network 308 or the monitoring application server 310 may relay data received from the monitoring system control unit 350 to the one or more user devices 320, 324 through the network 308. In this regard, the monitoring application server 310 may facilitate communication between the one or more user devices 320, 324 and the monitoring system.

In some implementations, the one or more user devices 320, 324 may be configured to switch whether the one or more user devices 320, 324 communicate with the monitoring system control unit 350 directly (e.g., through link 348) or through the monitoring application server 10 (e.g., through network 308) based on a location of the one or more user devices 320, 324. For instance, when the one or more user devices 320, 324 are located close to the monitoring system control unit 350 and in range to communicate directly with the monitoring system control unit 350, the one or more user devices 320, 324 use direct communication. When the one or more user devices 320, 324 are located far from the monitoring system control unit 350 and not in range to communicate directly with the monitoring system control unit 350, the one or more user devices 320, 324 use communication through the monitoring application server 310.

Although the one or more user devices 320, 324 are shown as being connected to the network 308, in some implementations, the one or more user devices 320, 324 are not connected to the network 308. In these implementations, the one or more user devices 320, 324 communicate directly with one or more of the monitoring system components and no network (e.g., Internet) connection or reliance on remote servers is needed.

In some implementations, the one or more user devices 320, 324 are used in conjunction with only local sensors and/or local devices in a house. In these implementations, the system 300 only includes the one or more user devices 320, 324, the sensors 312, the module 314, and the camera 362. The one or more user devices 320, 324 receive data directly from the sensors 312, the module 314, and the camera 362 and sends data directly to the sensors 312, the module 314, and the camera 362. The one or more user devices 320, 324 provide the appropriate interfaces/processing to provide visual surveillance and reporting.

In other implementations, the system 300 further includes network 308 and the sensors 312, the module 314, and the camera 362 are configured to communicate sensor and image data to the one or more user devices 320, 324 over network 308 (e.g., the Internet, cellular network, etc.). In yet another implementation, the sensors 312, the module 314, and the camera 362 (or a component, such as a bridge/router) are intelligent enough to change the communication pathway from a direct local pathway when the one or more user devices 320, 324 are in close physical proximity to the sensors 312, the module 314, and the camera 362 to a pathway over network 308 when the one or more user devices 320, 324 are farther from the sensors 312, the module 314, and the camera 362. In some examples, the system leverages GPS information from the one or more user devices 320, 324 to determine whether the one or more user devices 320, 324 are close enough to the sensors 312, the module 314, and the camera 362 to use the direct local pathway or whether the one or more user devices 320, 324 are far enough from the sensors 312, the module 314, and the camera 362 that the pathway over network 308 is required. In other examples, the system leverages status communications (e.g., pinging) between the one or more user devices 320, 324 and the sensors 312, the module 314, and the camera 362 to determine whether communication using the direct local pathway is possible. If communication using the direct local pathway is possible, the one or more user devices 320, 324 communicate with the sensors 312, the module 314, and the camera 362 using the direct local pathway. If communication using the direct local pathway is not possible, the one or more user devices 320, 324 communicate with the sensors 312, the module 314, and the camera 362 using the pathway over network 308.

In some implementations, the system 300 provides end users with access to images captured by the camera 362 to aid in decision making. The system 300 may transmit the images captured by the camera 362 over a wireless WAN network to the user devices 320, 324. Because transmission over a wireless WAN network may be relatively expensive, the system 300 uses several techniques to reduce costs while providing access to significant levels of useful visual information.

In some implementations, a state of the monitoring system and other events sensed by the monitoring system may be used to enable/disable video/image recording devices (e.g., the camera 362). In these implementations, the camera 362 may be set to capture images on a periodic basis when the alarm system is armed in an "Away" state, but set not to capture images when the alarm system is armed in a "Stay" state or disarmed. In addition, the camera 362 may be triggered to begin capturing images when the alarm system detects an event, such as an alarm event, a door opening event for a door that leads to an area within a field of view of the camera 362, or motion in the area within the field of view of the camera 362. In other implementations, the camera 362 may capture images continuously, but the captured images may be stored or transmitted over a network when needed.

In some implementations, all of the processing described throughout this disclosure may be implemented in a monitoring system control panel located inside the property being monitored, as opposed to sending data to an external server for processing. For example, rather than being a separate server located in a remote location, the monitoring application server 310 may be a logical component inside of the monitoring system control unit 350. In this example, the monitoring system control unit 350 performs the processing of supervising property access without having to send image/video data to a separate server separated by a network.

In other implementations, all of the processing described throughout this disclosure may be performed on a remote server (e.g., monitoring application server 310). In these implementations, the monitoring system control panel (or sensors themselves) may send image/video data to the remote server over a network and the remote server may perform all of supervising property access. For instance, the monitoring system control unit 350 sends all captured image/video data to the monitoring application server 310 and the monitoring application server 310 performs the processing of supervising property access.

In still further implementations, the processing described throughout this disclosure may be mixed between a monitoring system control panel and a remote server. In these implementations, the monitoring system control panel and the remote server may share operations needed to analyze the sensor data. For instance, the monitoring system control panel may perform the interpretation of image/video data collected relatively recently (e.g., image/video data collected within the past three months) and the remote server may perform the detection of patterns in image/video data collected over a longer period of time (e.g., image/video data collected over the past several years). Alternatively, the monitoring system control panel may perform pre-processing of the image/video data, including collection and aggregation of the image/video data, and the remote server may perform the detailed analysis of detecting patterns within the image/video data. In the example shown in FIG. 3, the processing described throughout this disclosure may be mixed between the monitoring system control unit 350 and the monitoring application server 310.

FIG. 4 is a flowchart of an example process 400 for utilizing a trained neural network model that detects localized weather and provides automated instructions to devices of a corresponding area. Generally, the process 400 includes obtaining data from one or more expected local weather devices and a camera from a first area; based on the obtained data from the expected local weather devices and the camera, pairing expected local weather forecasts from the expected local weather devices with corresponding media from the camera; providing the expected local weather forecasts paired with the corresponding media to a weather classifier to determine a current weather prediction in proximity to a geographic area of the first area; providing the current weather prediction paired and obtained sensor data from the first area to a control module to determine property automation instructions to provide to a client device and a home device both corresponding with the first area; and providing the determined property automation instructions and the current weather prediction to the client device and the home device of the first area. Alternatively, the process 400 can be used for utilizing a trained neural network model for other implementations for one or more cameras, such as identifying weather damage, to name an example. The process 400 will be described as being performed by a computer system comprising one or more computers, for example, the system 100 as shown in FIG. 1 or the computing system 200 as shown in FIGS. 2A and 2B.

During 402, the system obtains data from one or more expected local weather devices and a camera from a first area. In some implementations, the data analyzer 112 receives media from each monitor unit 110 recorded by a corresponding camera 111. For instance, the monitor unit 110-1 of monitored property 102-1 provides recorded media 120, the monitor unit 110-2 of monitored property 102-2 provides recorded media 124, the monitor unit 110-3 of monitored property 102-3 provides recorded media 122, and the monitor unit 110-1 of monitored property 102-4 provides recorded media 126 to the data analyzer 112. The recorded media can be real time video or image frames from each of the cameras 106 in a respective monitored property 102. In some implementations, the monitor unit 110 can transmit real-time recorded media from each of the cameras 106. In other implementations, the monitor unit 110 can transmit post-recorded media from each of the cameras 106 to the data analyzer 112.

In some implementations, the data analyzer 112 receives expected local weather 116 from various weather sources. For instances, the expected local weather 116 acquires sensor data of weather forecasting from various weather sources, such as for example, weather forecasts from an expected local weather source, weather data from barometers, thermometers, hygrometers, anemometers, and rain gauges for weather analysis. The expected local weather 116 retrieves weather data for weather in proximity and encompassing the geographic regions. For instance, the data analyzer 112 knows geographic region 1 is found within zip code 11111 and geographic region 2 is found within zip code 11112. The data analyzer 112 uses the location information of each geographic region to determine a corresponding location for the weather data to retrieve from the expected local weather 116.

During 404, the system, based on the obtained data from the expected local weather devices and the camera, pairs expected local weather forecasts from the expected local weather devices with corresponding media from the camera. In some implementations, the combining module 206 within the data analyzer 112 correlates recorded media from each monitor unit corresponding to a monitored property with the data indicative of the expected local weather forecast 214. For example, the data from the one or more websites, data from the barometers, thermometers, anemometers, and rain gauges suggests the weather within proximity to the monitored property 102, and more particular, to the weather shown in each frame of the recorded media from each monitored property. In order for the weather devices (e.g., barometers, thermometers, anemometers, and rain gauges) to accurately forecast weather within proximity to a particular monitored property 102, the weather devices need to also be within proximity to the particular monitored property 102.

In some implementations, the weather can be shown in a particular portion of the recorded media. In particular, the weather can be shown in a foreground, in a mid-ground, or a background of the media. For example, the snow, which is shown in the foreground, is front of a tree, which is shown in the background, of the recorded media. During training of the trained neural network model, the combining module 206 can tag the portion of the recorded media that includes the weather. For example, if the recorded media includes snow in the background, then the combining module 206 tags the snow in the background with one or more labels. This allows the model trainer 210 to properly train the neural network model to detect a particular weather in any portion of the recorded media.

During 406, the system provides the expected local weather forecasts paired with the corresponding media to a weather classifier to determine a current weather prediction in proximity to a geographic area of the first area. In some implementations, a camera, such as camera 111-1, corresponding to monitored property 102-1 provides recorded media to a weather classifier (e.g., trained visual model) to produce a current weather prediction. In particular, the camera 111-1 may provide each frame of the recorded media to the trained visual model in the data analyzer 112 over the network 131. In some implementations, data indicative of the expected local weather forecast 216 is provided to the trained visual model along with the frame of the recorded media to supplement the trained visual model's accuracy of the weather classification. For example, the trained visual model will receive one or more frames of the recorded media illustrating a backyard of the monitored property 102-1 along with data indicative of the expected local weather forecast 216 that describe sunny weather within proximity to the monitored property 102-1.

During 408, the system provides the current weather prediction paired and obtained sensor data from the first area to a control module to determine property automation instructions to provide to a client device and a home device both corresponding with the first area. In some implementations, the trained visual model outputs a weather classification in response to analyzing a frame of the recorded media along with the data indicative of the expected local weather forecast 216. In other implementations, the data indicative of the expected local weather forecast 216 is provided as an optional feature to the trained visual model. In other implementations, the data indicative of the expected local weather forecast 216 is augmented with the output of the weather classification to check the correctness of the weather classification. For instance, the data indicative of the expected local weather forecast 216 can provide a strong indication of the weather forecast, especially the data pulled from one or more weather websites. As a result, the website data can be compared to the weather classification to determine the trained visual model's accuracy.

In some implementations, the data analyzer 112 can use the output weather classification 220, sensors data 222, and home device data 224 to determine one or more safety automation instructions to provide to the corresponding monitored property 102. For instance, the data analyzer 112 includes a control module 226 that processes the output weather classification 220, sensor data 22, and home device data 224 to determine the one or more safety automation instructions. For example, the trained visual model produces a weather classification of rain within proximity to the monitored property 102-1, the sensor data 222 provides an indication that the garage door of the monitored property 102-1 is open, and the home device data 224 indicates that all devices are powered down. In some implementations, the control module 226 determines that the weather classification 220 indicates that the type of weather could potentially damage a monitored property. If the control module 226 notices any of the monitored property's doors, windows, or garages are unlocked or opened, the control module 226 will generate an instruction to notify the property owner of the corresponding monitored property.

During 410, the system provides the determined property automation instructions and the current weather prediction to the client device and the home device of the first area. In some implementations, the control module 226 adds the determined property automation instruction to the message 228 to provide to the monitor unit 110. In some implementations, the data analyzer 112 transmits the message 228 to the monitor unit 110 corresponding to the monitored property 102. In other implementations, the data analyzer 112 transmits the message 228 to the client device corresponding to the property owner of the monitored property 102. In response to the monitor unit 110 receiving the automation instruction 228 from the data analyzer 112, the monitor unit server 110 transmits a notification to the corresponding device for action. For example, if the automation instruction 228 includes an indication to the close the front door of the monitored property 102-1 because the local weather forecasts rain, the monitor unit 110 automatically closes the front door. In other implementation, when the client device corresponding to the property owner of the monitored property 102 receives the message 228 from the data analyzer 112, the property owner is prompted with message 228 in order to perform the requested action determined by the control module 226.

Figure 5:
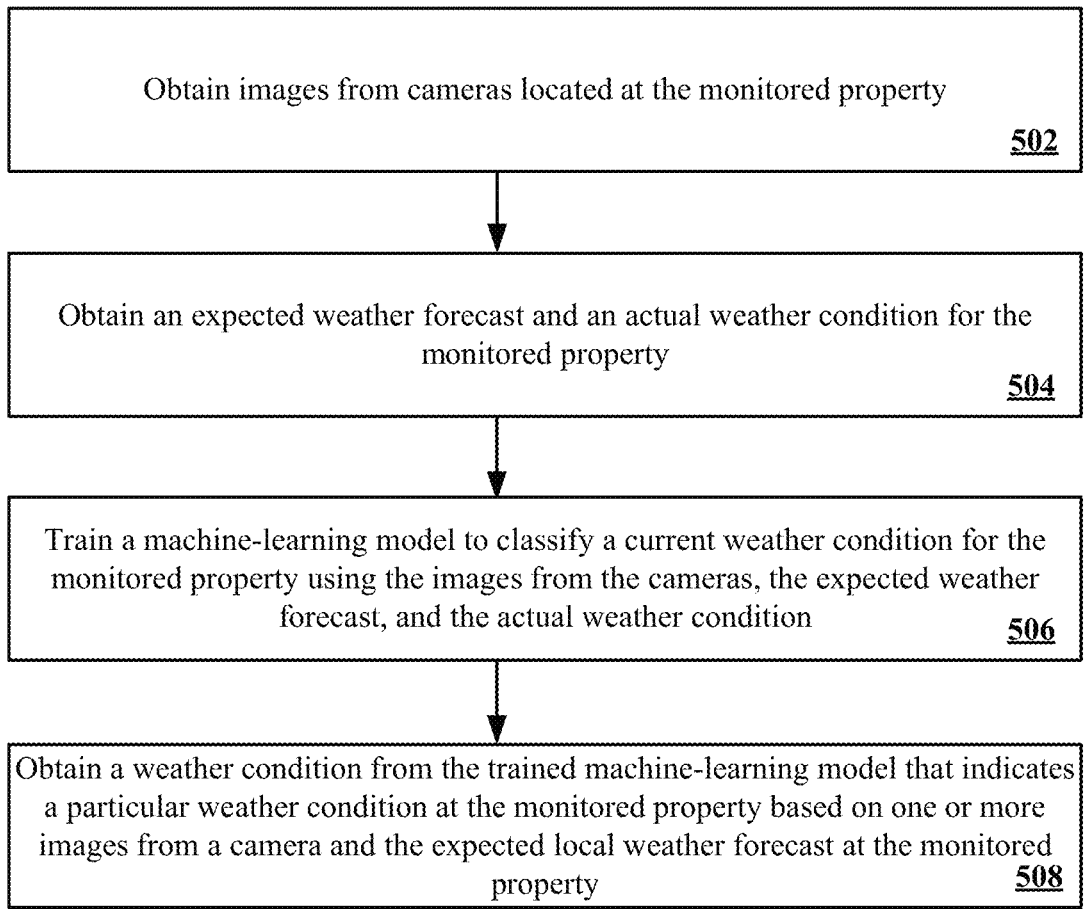
FIG. 5 is a flowchart illustrating of another example process for utilizing a trained neural network that detects localized weather and provides automated instructions to devices of a monitored property.

FIG. 5 is a flowchart of another example process 500 for utilizing a trained neural network model that detects localized weather and provides automated instructions to devices of a monitored property. Generally, the process 500 includes obtaining images from cameras located at the monitored property; obtaining an expected weather forecast and an actual weather condition for the monitored property; training a machine learning model to classify a current weather condition for the monitored property using the images from the cameras, the expected weather forecast, and the actual weather condition; and, obtaining a weather condition from the trained machine learning model that indicates a particular weather condition at the monitored property based on one or more images from a camera and the expected local weather forecast at the monitored property. The process 500 will be described as being performed by a computer system comprising one or more computers, for example, the system 100 as shown in FIG. 1 or the computing system 200 as shown in FIGS. 2A and 2B.

During 502, the system obtains images from cameras located at the monitored property. In some implementations, the data analyzer 112 receives media from a monitor unit at a monitored property. The data analyzer 112 can receive media from each of the monitor units from each monitored property. The monitor unit at each monitored property provides media received from its cameras to the data analyzer. For example, as illustrated in system 100, the data analyzer 112 receives media data 120 from monitor unit 110-1, which received the media data 120 from a camera 111-1 or multiple cameras 106-1. The media can include real time video footage or images from the cameras 106 at a corresponding monitored property. In some implementations, the data analyzer 112 can receive post-recorded media from each of the monitor units 110.

The media can included recorded footage or images of areas within a monitored property. For example, the areas can include areas surrounding the interior and exterior of the front door of the monitored property; areas surrounding a backyard of the monitored property; areas within the monitored property, such as a living room, basement, and bedroom. The media may illustrate a deck area of the monitored property or areas within the monitored property that include one or more windows with a view to the outside of the monitored property. The media can include recorded images and recorded footage.

During 504, the system obtains an expected weather forecast and an actual weather condition for the monitored property. For example, the data analyzer can acquire the expected weather forecast from a third party resource, such as a local weather source or the Internet. Additionally, the data analyzer retrieves an actual weather condition for the monitored property from various weather sources. For example, the data analyzer can retrieve pressure data from barometers, temperature data from thermometers, humidity and water data from hygrometers, wind speed data from anemometers, and rain data from rain gauges. The data analyzer can acquire the actual weather condition data for regions in proximity to a particular monitored property. For example, the data analyzer 112 determines that geographic region 1 has a zip code of 12345 and geographic region 2 has a zip code of 12346. Then, the data analyzer 112 retrieves expected local forecast data and actual weather condition data corresponding to the zip codes of those geographic regions.

During 506, the system trains a machine-learning model to classify a current weather condition for the monitored property using the images from the cameras, the expected weather forecast, and the actual weather condition. In particular, the data analyzer 112 includes a model trainer that provides the media data from the cameras, an expected weather forecast, and an actual weather condition to train a neural network model or any other type of machine-learning model. The model trainer trains the machine-learning model with the media data, the data describing the forecasted weather, and the actual weather to recognize the presence or absence of a particular weather condition in an image frame or multiple image frames provided by a camera. With sufficient training data, the machine-learning model can generate a particular weather condition, e.g., snow, rain, or sleet. In response, the data analysis can provide the generated particular weather condition to a property owner of the monitored property, thus obviating the need for weather measuring tools to determine the weather.

In some implementations, the data analysis pairs the images from the cameras with data identifying the expected weather forecasts for the monitored property. For example, the data analyzer 112 includes a combining module 206 that receives recorded media from cameras at a monitored property and data indicative of an expected weather forecast. The combining module 206 correlates and combines the recorded media with the data indicative of the expected weather forecast. The recorded media may illustrate a particular weather condition in a foreground, a mid-ground, or a background of its image or video footage. For example, the combining module 206 tags or labels the particular weather condition in the recorded media with the expected weather forecast. For example, the combining module 206 can tag snow shown in the foreground of the recorded media with a label of data indicative of the expected local weather, e.g., snow. In another example, the combining module 206 can tag rain shown in the background of the recorded media with a label of data indicative of the expected local weather, e.g., rain.

The combining module 206 then provides the tagged media data to the model trainer for training the machine-learning model. The combining module 206 can also provide an indication of the actual weather condition for the monitored property to the model trainer. The actual weather condition describes the current weather condition at the monitored property. The actual weather condition can be different from the expected weather forecast. For example, the expected weather forecast may indicate rainy weather at the monitored property, while the actual weather condition is sunny. By providing the actual weather condition with the expected weather forecast, the trained machine-learning model benefits by improving its accuracy of weather conditions found in images where the expected weather forecast is different from the actual weather condition. The trained machine-learning model may produce a result that is different from the input expected weather forecast during its implementation on the camera.

The model trainer trains the machine-learning model using multiple frames of media to detect a particular weather condition. Additionally, the machine-learning model can detect a particular weather type by analyzing a rate at which an object, e.g., snowflake, moves across the frames of images. For example, by training the machine-learning model to detect a particular weather condition using multiple subsequent image frames, the machine-learning model can detect snowflakes and their speed as they move across the frames of images. By analyzing an object's rate of movement or speed in subsequent images, the trained machine-learning model can determine whether the object is precipitation, such as rain or snow, or another object. The combining module measures the speed of the object by determining the object's change in distance across a first frame and a second frame and dividing the distance by the time difference between the two frames. Once the data analyzer sufficiently trains the machine-learning model to produce accurate weather conditions in image data, the data analyzer 112 can provide the trained machine-learning model to each camera at each monitored property.

During 508, the system obtains a weather condition from the trained machine-learning model that indicates a particular weather condition at the monitored property based on one or more images from a camera and the expected local weather forecast at the monitored property. For example, the camera, at a particular monitored property, may record media footage of a view of the front yard in the monitored property. The camera can provide each frame of the recorded footage to its trained visual model. In some implementations, the cameras may provide the recorded footage to the data analyzer for processing through the data analyzer's trained visual model.

The camera also retrieves expected weather forecasts from the data analyzer when processing the recorded footage through the trained visual model. The camera transmits a request to the data analyzer for the expected weather forecasts and in response, receives the expected weather forecast for the particular monitored property where the camera is located from the data analyzer. The camera provides the recorded media and the expected weather forecast to the trained machine-learning model.

In response, the trained machine-learning model produces an output of a weather condition that describes a particular weather condition at the monitored property. In other implementations, if the trained machine-learning model executes on the data analyzer, the trained machine-learning model produces a weather condition for the monitored property and the data analyzer provides the output weather condition to the monitored control unit at the monitored property. In some implementations, the data analyzer can transmit the weather condition to the client device of the owner of the monitored property. In other implementations, in response to the monitor unit receiving the notification of the weather condition from the camera, the monitor unit transmits a notification to the client device of the owner of the monitored property. In other implementations, the camera or the monitor unit transmits a live video feed of the camera to the client device of the property owner for real time viewing purposes along with a current weather label describing the output weather condition.

In some implementations, in response to the trained visual model executing on the data analyzer or the camera, the data analyzer receives feedback from each of the monitored properties to fine tune the trained machine-learning model. For example, the feedback data can include new image data corresponding to a newly installed camera at the monitored property. In another example, the feedback data can include a correction of the labeled data associated with media data. For example, the data analyzer provides an indication of a weather condition to a client device of a property owner for a monitored property. The property owner can review the weather condition on his or her client device that includes the media data and a label of the weather classification corresponding to the output of the trained machine-learning model.

After the property owner reviews the media data and the corresponding weather classification label, the property owner can determine that the weather classification label is incorrect. The property owner can then interact with an application on his or her client device to indicate that the determined weather classification is incorrect, for example. In addition, the property owner can indicate that the weather classification label should read "rain" and not "snow." In response, the client device can transmit the correction to the monitor unit corresponding to the monitored property or to the data analyzer. If the client device transmits the correction to the monitor unit, the monitor unit relays the correction to the data analyzer to indicate that the trained machine-learning model has incorrectly detected a weather classification. In response, the data analyzer can take steps to retrain the trained machine-learning model. For example, the data analyzer provides the recorded media with the corrected classification label to the model trainer for retraining the machine-learning model. Once the model trainer has retrained the machine-learning model to properly classify the media, the data analyzer provides the updated trained machine-learning model to each of the cameras at the monitored properties for an improved and updated weather classification detection.

In some implementations, the data analyzer can use the weather classification data, data from sensors at the monitored property, and data from the devices to determine one or more safety instructions to provide to devices at the monitored property. For example, the data analyzer can process the weather classification data, the sensor data from a monitored property, and the device data, to determine the safety instructions. In particular, the weather classification data can indicate that the current weather at the monitored property is rain, the sensor data indicates that the front door of the monitored property is open and unlocked, and other sensor data indicates that the back door of the monitored property is open. The data analyzer determines that the weather classification label, which indicates that it is raining at the monitored property, includes a weather condition that can potentially damage a portion of an interior or exterior of the monitored property. In addition, the data analyzer determines that based on the weather classification, each door and window of the monitored property should be closed and the property owner should be notified. In this example, the data analyzer notifies the property owner to close the front door and the back door through his or her client device. In another example, the data analyzer can transmit a notification to a control module located at both the front and back doors to automatically close both doors and lock them upon closing. In another example, a window at the monitored property may be opened, and the data analyzer can transmit a notification to the property owner and a notification to a control module located at the window to close and lock the window to avoid a portion of the monitored property becoming wet due to the rain.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method, comprising:
   obtaining images from a camera located at a monitored property;
   determining that the monitored property is located within a particular geographic region;
   obtaining, for each of the images from the camera at the monitored property and based on the particular geographic region, an expected weather forecast for the geographic region at a time the image was captured, and an actual weather condition at the monitored property at the time the image was captured;
   generating a training set that includes each of the images labeled with both (i) an indication of the expected weather forecast for the geographic region at the time the image was captured and (ii) an indication of the actual weather condition at the monitored property at the time the image was captured;
   training a machine-learning model to classify a current weather condition for the monitored property using the training set that includes the images from the camera, the indications of expected weather forecast for the geographic region at the time the images were captured, and the actual weather condition at the monitored property at the time the images were captured;
   obtaining a subsequent image from the camera and a subsequent expected local weather forecast for the monitored property at the time the subsequent image was captured;
   providing the subsequent image from the camera and the subsequent expected local weather for the monitored property at the time the subsequent image was captured as inputs to the machine-learning model; and
   receiving, in response to providing the subsequent image from the camera and the subsequent expected local weather for the monitored property at the time the subsequent image was captured as inputs to the machine-learning model, a weather condition from the trained machine-learning model that indicates a particular weather condition at the monitored property based on the subsequent image from the camera and the subsequent expected local weather forecast for the monitored property at the time the subsequent image was captured.

2. The computer-implemented method of claim 1, wherein obtaining the expected weather forecast and the actual weather condition for the monitored property further comprises:
   obtaining the expected weather forecast from a third party resource; and
   obtaining the actual weather condition from water sensors at the monitored property.

3. The computer-implemented method of claim 1, further comprising:
   determining a device at the monitored property that exposes a portion of the monitored property to the particular weather condition; and
   providing an instruction to the device that adjusts a position of the device to reduce an exposure of the portion of the monitored property to the particular weather condition.

4. The computer-implemented method of claim 3, wherein providing the instruction to the device further comprises providing an instruction to close and lock a front door of the monitored property when the particular weather condition includes rain at the monitored property.

5. The computer-implemented method of claim 1, further comprising:
   providing the current weather condition to a client device owned by a property owner of the monitored property;

receiving a correction to the current weather condition from the client device; and training the trained machine-learning model to generate the correction to the current weather condition using the correction to the current weather condition, the one or more images from the camera and the expected local weather forecast used to generate the current weather condition.

6. The computer-implemented method of claim 1, comprising:

providing the trained machine-learning model to each of the cameras at the monitored property; and receiving an additional weather condition from the trained machine-learning at each of the cameras.

7. A system comprising:

one or more computers; and one or more computers and one or more storage devices storing instructions that are operable, when executed by the one or more computers, to cause the one or more computers to perform operations comprising:

obtaining images from a camera located at a monitored property;

determining that the monitored property is located within a particular geographic region;

obtaining, for each of the images from the camera at the monitored property and based on the particular geographic region, an expected weather forecast for the geographic region at a time the image was captured, and an actual weather condition at the monitored property at the time the image was captured;

generating a training set that includes each of the images labeled with both (i) an indication of the expected weather forecast for the geographic region at the time the image was captured and (ii) an indication of the actual weather condition at the monitored property at the time the image was captured;

training a machine-learning model to classify a current weather condition for the monitored property using the training set that includes the images from the camera, the indications of expected weather forecast for the geographic region at the time the images were captured, and the actual weather condition at the monitored property at the time the images were captured;

obtaining a subsequent image from the camera and a subsequent expected local weather forecast for the monitored property at the time the subsequent image was captured;

providing the subsequent image from the camera and the subsequent expected local weather for the monitored property at the time the subsequent image was captured as inputs to the machine-learning model; and receiving, in response to providing the subsequent image from the camera and the subsequent expected local weather for the monitored property at the time the subsequent image was captured as inputs to the machine-learning model, a weather condition from the trained machine-learning model that indicates a particular weather condition at the monitored property based on the subsequent image from the camera and the subsequent expected local weather forecast for the monitored property at the time the subsequent image was captured.

8. The system of claim 7, wherein obtaining the expected weather forecast and the actual weather condition for the monitored property further comprises:

obtaining the expected weather forecast from a third party resource; and obtaining the actual weather condition from water sensors at the monitored property.

9. The system of claim 7, wherein the operations comprise:

determining a device at the monitored property that exposes a portion of the monitored property to the particular weather condition; and providing an instruction to the device that adjusts a position of the device to reduce an exposure of the portion of the monitored property to the particular weather condition.

10. The system of claim 9, wherein providing the instruction to the device further comprises providing an instruction to close and lock a front door of the monitored property when the particular weather condition includes rain at the monitored property.

11. The system of claim 7, wherein the operations comprise:

providing the current weather condition to a client device owned by a property owner of the monitored property;

receiving a correction to the current weather condition from the client device; and training the trained machine-learning model to generate the correction to the current weather condition using the correction to the current weather condition, the one or more images from the camera and the expected local weather forecast used to generate the current weather condition.

12. The system of claim 7, wherein the operations comprise:

providing the trained machine-learning model to each of the cameras at the monitored property; and receiving an additional weather condition from the trained machine-learning at each of the cameras.

13. A non-transitory computer-readable medium storing software comprising instructions executable by one or more computers which, upon such execution, cause the one or more computers to perform operations comprising:

obtaining images from a camera located at a monitored property;

determining that the monitored property is located within a particular geographic region;

obtaining, for each of the images from the camera at the monitored property and based on the particular geographic region, an expected weather forecast for the geographic region at a time the image was captured, and an actual weather condition at the monitored property at the time the image was captured;

generating a training set that includes each of the images labeled with both (i) an indication of the expected weather forecast for the geographic region at the time the image was captured and (ii) an indication of the actual weather condition at the monitored property at the time the image was captured;

training a machine-learning model to classify a current weather condition for the monitored property using the training set that includes the images from the camera, the indications of expected weather forecast for the geographic region at the time the images were captured, and the actual weather condition at the monitored property at the time the images were captured;

obtaining a subsequent image from the camera and a subsequent expected local weather forecast for the monitored property at the time the subsequent image was captured;

providing the subsequent image from the camera and the subsequent expected local weather for the monitored property at the time the subsequent image was captured as inputs to the machine-learning model; and receiving, in response to providing the subsequent image from the camera and the subsequent expected local weather for the monitored property at the time the subsequent image was captured as inputs to the machine-learning model, a weather condition from the trained machine-learning model that indicates a particular weather condition at the monitored property based on the subsequent image from the camera and the subsequent expected local weather forecast for the monitored property at the time the subsequent image was captured.

14. The computer-readable medium of claim 13, further comprising:

determining a device at the monitored property that exposes a portion of the monitored property to the particular weather condition; and providing an instruction to the device that adjusts a position of the device to reduce an exposure of the portion of the monitored property to the particular weather condition.

15. The computer-readable medium of claim 14, wherein providing the instruction to the device further comprises providing an instruction to close and lock a front door of the monitored property when the particular weather condition includes rain at the monitored property.

16. The computer-readable medium of claim 13, further comprising:

providing the current weather condition to a client device owned by a property owner of the monitored property;

receiving a correction to the current weather condition from the client device; and training the trained machine-learning model to generate the correction to the current weather condition using the correction to the current weather condition, the one or more images from the camera and the expected local weather forecast used to generate the current weather condition.

* * * * *